Feb. 14, 1961   J. S. COWAN   2,971,264
LEVELLING SYSTEM
Filed Jan. 29, 1959

INVENTOR
James S. Cowan

BY  Moore and Hall

ATTORNEYS

United States Patent Office 2,971,264
Patented Feb. 14, 1961

2,971,264

LEVELLING SYSTEM

James Stanley Cowan, % Nelson Green, 343 E. 46th St., Jacksonville 8, Fla.

Filed Jan. 29, 1959, Ser. No. 789,986

1 Claim. (Cl. 33—209)

This invention relates to a levelling system, and more particularly pertains to a system adapted for levelling a mobile dwelling or house trailer.

When a house trailer is to be kept in one location for a considerable length of time, it is usually considered desirable that it be provided with a more stable foundation than the conventional wheels and running gear by which it is transported from one location to another. Ordinarily, the wheels are elevated and a number of adjustable jacks are placed about its perimeter in order to support it. It is, of course, desirable that the various jacks be so adjusted that the trailer will be in a level position. It has in the past been difficult to obtain such adjustment because the means available for levelling has been highly inconvenient to use. The situation is aggravated by the fact that, since a trailer is supported at only a relatively small number of points rather than uniformly about its perimeter and at intermediate points within the perimeter as with an ordinary structure, the unit pressures on the foundation may be extremely high. This tends to produce serious problems of settling depending upon the nature of the foundation, the extremes of temperature variation, and the like.

It has been found that the use of an ordinary spirit level does not provide a sufficiently accurate means of levelling a trailer. Also, the various water levelling systems known in the art have been found to be extremely inconvenient to use.

Therefore, it is an object of this invention to provide a levelling system for a structure such as a house trailer which is a permanent part of the structure so that it is very convenient to use.

It is another object of this invention to provide a levelling system for a trailer which provides a plurality of measuring stations, preferably one adjacent each of the jacks or other means used for supporting the trailer.

In describing this invention, reference will be made to the accompanying drawings which illustrate one embodiment of this invention and in which:

Fig. 1 illustrates a side view of a typical house trailer showing a plurality of the level measuring stations;

Fig. 2 diagrammatically illustrates the fluid conductor means for connecting the various tubes at the respective level measuring stations to the fluid source;

According to this invention, a transparent tube is supported in a generally vertical position at each of a plurality of stations around the perimeter of the trailer. Preferably each of these tubes is supported independently of the trailer so that levelling adjustments of the trailer do not affect the position of the tubes. There is affixed to the trailer itself a supply pipe or conductor, and there are connections made from this supply pipe to each of the different transparent tubes stationed around the perimeter of the trailer. The supply pipe is connected to a source of fluid under pressure through a shut-off valve so that fluid may be added to the system as desired. A cap is provided for the top of each of the level measuring tubes so that entrapped air may be permitted to escape. A vent connection which may be opened as required is provided for the supply pipe so that the fluid in the system may freely circulate when the shut-off valve is closed and thus establish its own level.

Figure 1:
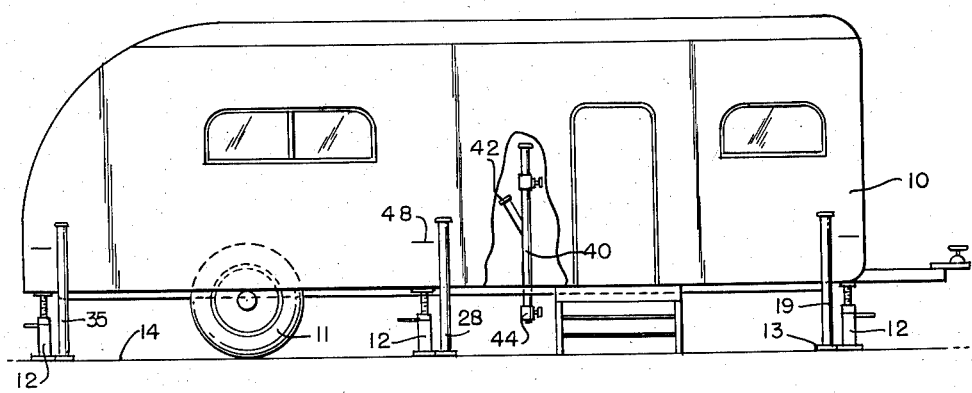

Referring to the drawings, Fig. 1 illustrates a typical house trailer 10 which is normally supported by its wheels 11. When the trailer is to be kept in one place for a considerable length of time, it is desirable that it be supported instead by means such as the various jacks 12 which are located at various points around its perimeter. As shown in Fig. 1, there are three such jacks 12 along one side of the trailer, making six jacks altogether for supporting the entire weight of the trailer.

Figure 2:
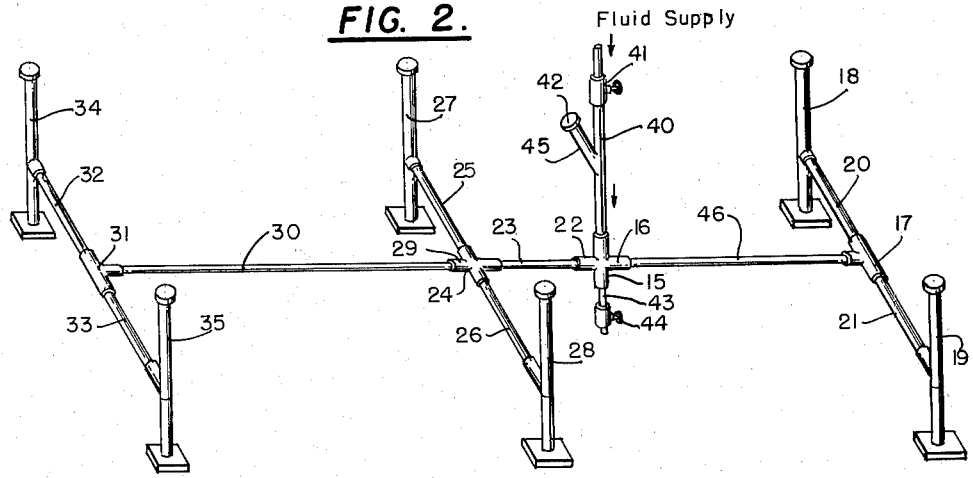

As part of the levelling system of this invention, Fig. 1 shows transparent level measuring tubes 19, 28, and 35 located adjacent respective ones of the jacks 12 and with each tube supported upon an associated base such as the base 13 provided for tube 19. Each base rests upon the surface 14 on which the trailer is to be supported, and it will be understood that this base may not be horizontal and may also not be a flat plane surface. As shown in Figs. 1 and 2, there is permanently fixed to the structure 10 a supply pipe 40 which is connected through a shut-off valve 41 to a source of fluid under pressure. From the lower portion of the supply pipe 40, there are connections made via the horizontal pipes which are disposed along the floor of the trailer to convey fluid from the vertical supply pipe 40 to each of the level measuring tubes. It will be noted that there is a Y-connection 45 in the vertical supply pipe, and the end of the Y-connection has a cap 42 which may be removed to provide an open connection to the atmosphere for purposes to be presently described.

The vertical supply pipe 40 may be connected to a double-T fitting 15, the lower outlet of which is connected over a short nipple 43 to a valve 44 which, when opened, permits the entire system to be drained of fluid. The outlet end 16 of the fitting 15 has connected thereto a length of tubing 46 which runs to the forward part of the trailer to a T fitting 17 which then supplies fluid to the level measuring tubes 18 and 19 over the lengths of tubing 20 and 21, respectively. The outlet 22 of the double-T fitting 15 has a length of tubing 23 connected thereto which then feeds, over a double-T fitting 24 and tubing lengths 25 and 26, the level measuring tubes 27 and 28, respectively. The outlet 29 of the double-T fitting 24 has connected thereto the length of tubing 30 which has the T-fitting 31 connected to its opposite end. The outlet ends of this T-fitting 31 then provide connections over tubing lengths 32 and 33 to the level measuring tubes 34 and 35, respectively.

Figure 3:
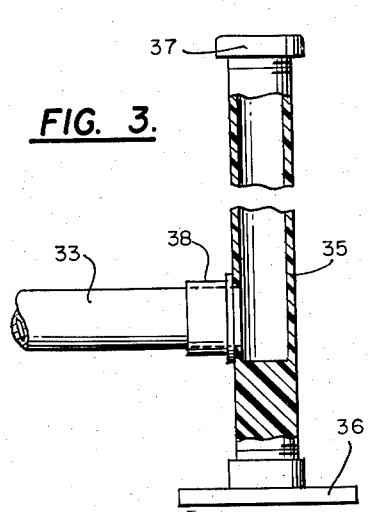
Fig. 3 is a cross-sectional view of one of the level measuring tubes.

Each of the level measuring tubes such as tube 35 which is shown in greater detail in Fig. 3 is preferably formed of a transparent material and may be made of a suitable plastic. Its lower end is provided with threads so that it may be screwed into the base member 36 which holds the tube in a generally vertical position. Its upper end is also threaded so that the cap 37 may be screwed thereon. The lower portion may be of solid material, as shown, but may also be hollow if desired. Fluid is admitted to the hollow tube through the side opening having the collar fitting 38 into which the tubing 33 fits tightly.

Figure 4:
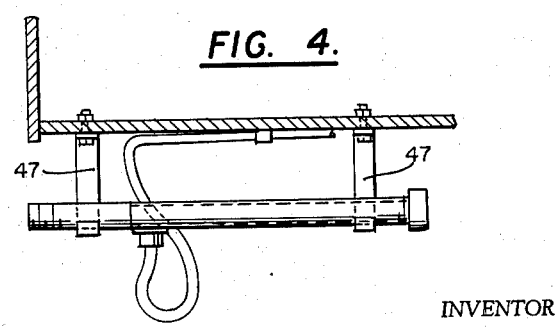
Fig. 4 illustrates the manner in which the various level measuring tubes may be stored beneath the floor of the trailer without being disconnected from the fluid conducting means.

As shown in Fig. 4, the tubular connection to each level measuring tube may be of sufficient length and also sufficiently flexible so that the station tube may be placed horizontally in racks 47 affixed to the under side of the trailer floor. Thus, when not in use, the base 36 may be unscrewed from each level measuring tube, and the tube can then be placed in the rack underneath the trailer where it will be out of the way and yet convenient for subsequent use if a re-levelling of the trailer is required.

In operation, each tube is removed from its rack, screwed into its base member, and set on the surface 14 closely adjacent the outer walls of the trailer. The system is then filled with fluid by first removing the caps 37 from each of the level measuring tubes so that air entrapped in the system and in each tube may be expilled as fluid enters. The drain valve 44 is, of course, closed, and the cap 42 is securely screwed onto the Y-connection so that no fluid can be expelled at that point. The shut-off valve 41 is then opened so that fluid under pressure from the source is let into the system and fills each of the level measuring tubes. When the desired fluid level is reached, the shut-off valve 41 is closed. The cap 42 is then removed from the Y-connection so that the system will not remain air-locked. If it is determined that there is now too much fluid in the system, the excess may readily be removed by opening the drain valve 44 until the desired level is obtained.

It will be noted that in Fig. 1 a mark or horizontal line is shown on the side of the trailer at each of the various support points; a typical one of these is shown at 48. These marks are so positioned that they are all in exactly the same horizontal plane when the trailer is in the desired level position. To level the trailer, it is determined, at one of the measuring stations, what difference in levels exists between the mark on the trailer and the level of fluid in the adjacent level measuring tube. The difference in these levels may be accurately determined by measuring from the mark or horizontal line to the level of the water or fluid in the level measuring tubes. It is then only necessary to go from one to the other of the level measuring tubes and associated jacks and adjust each jack until the difference in level between the mark on the trailer at that point and the fluid level in the station tube is the same as it was at the first station. Preferably, each level measuring tube is in use, positioned so as to be closely adjacent one of the trailer supports such as a jack 12 shown in Fig. 1. In this way, when one jack is adjusted so as to produce the desired height of the mark on the trailer with the fluid level in the associated tube, the subsequent adjustment of another jack will not ordinarily affect any previously made measurements and adjustments. Moreover, since the tubes are all positioned and held in place independently of the trailer, the movement of the trailer which results from the levelling does not affect the level of the fluid in the tubes. Obviously the fluid levels in all the tubes are all in exactly the same horizontal plane so that if all the marks on the trailer are adjusted to be the same distance above or below the respective fluid levels in the adjacent tubes, the trailer will then be in a perfectly level position.

The drawings and the accompanying specification describe one specific embodiment of this invention and it will be understood that various adaptations, modifications and alterations may be made to the specific form shown without departing from the spirit or scope of this invention.

What I claim is:

In combination, means for levelling a portable house trailer having datum marks thereon which are all in the same horizontal plane when said trailer is level comprising, a plurality of tubular transparent gauging members, a support for each gauging member to hold it in a generally vertical position independently of said trailer adjacent its perimeter at a levelling station adjacent one of said datum marks, a supply pipe affixed to said trailer and adapted for selective connection at one end thereof to a water pressure main, a shut-off valve in said connection, fluid conducting means affixed to the bottom of said trailer for connecting the other end of said supply pipe to each of a plurality of locations around the perimeter of said trailer and respectively adjacent said levelling stations, a flexible connection between each tubular gauging member near its bottom and said fluid conducting means at each of said plurality of locations, a removable cap for the top of each tubular gauging member, a selectively openable vent connection to said supply pipe at a level higher than the normally expected fluid level in any of said gauging members, and means including a shut-off valve connected to said conducting means at the lowest point thereof for draining said conducting means and said gauging members and said supply pipe, whereby each of said gauging members may be filled with water from said water main and said datum marks adjusted to be equidistant from the level of the fluid column in the respective gauging members to thereby level said trailer.

References Cited in the file of this patent
UNITED STATES PATENTS

| | | |
|---|---|---|
| 859,903 | Finer | July 9, 1907 |
| 946,660 | Deslattes | Jan. 18, 1910 |
| 2,295,957 | Laurencelle | Sept. 15, 1942 |
| 2,308,088 | Liverman | Jan. 12, 1943 |
| 2,382,525 | Wellington | Aug. 14, 1945 |